United States Patent [19]

Gleba

[11] 3,772,797
[45] Nov. 20, 1973

[54] OPTICAL PLUMB BOB AND METHOD

[76] Inventor: Joseph Gleba, 5128 Hutchinson St., Chicago, Ill. 60641

[22] Filed: May 30, 1972

[21] Appl. No.: 257,619

[52] U.S. Cl. .................................................. 33/227
[51] Int. Cl............................................. G01c 15/00
[58] Field of Search................... 33/227, 275, 283, 33/286, 397, 398, 332

[56] References Cited
UNITED STATES PATENTS

| | | | |
|---|---|---|---|
| 2,517,295 | 8/1950 | Esher | 33/275 R |
| 3,044,173 | 7/1962 | O'Neal | 33/227 |
| 3,324,557 | 6/1967 | Hodges | 33/227 |
| 3,505,739 | 4/1970 | Abrams | 33/227 |

Primary Examiner—Louis R. Prince
Assistant Examiner—Charles E. Phillips
Attorney—Dawson, Tilton, Fallon & Lungmus

[57] ABSTRACT

An optical plumb bob having a base, an optical ray tube gimbaled together on the base and having lenses, light and a cross hair scope therein to project a cross hair image on the ceiling, the bottom of the tube being equipped with a movable magnetically attached floor pointer and a removable magnetically attached weight so that after the cross hair image is focused on a ceiling point, the bob can be calibrated by shifting the pointer or weight or both so as to direct the pointer at a floor point vertically below the ceiling point whereby the bob is calibrated for locating other ceiling points (as for hangars) which are vertically above pre-selected floor points.

7 Claims, 4 Drawing Figures

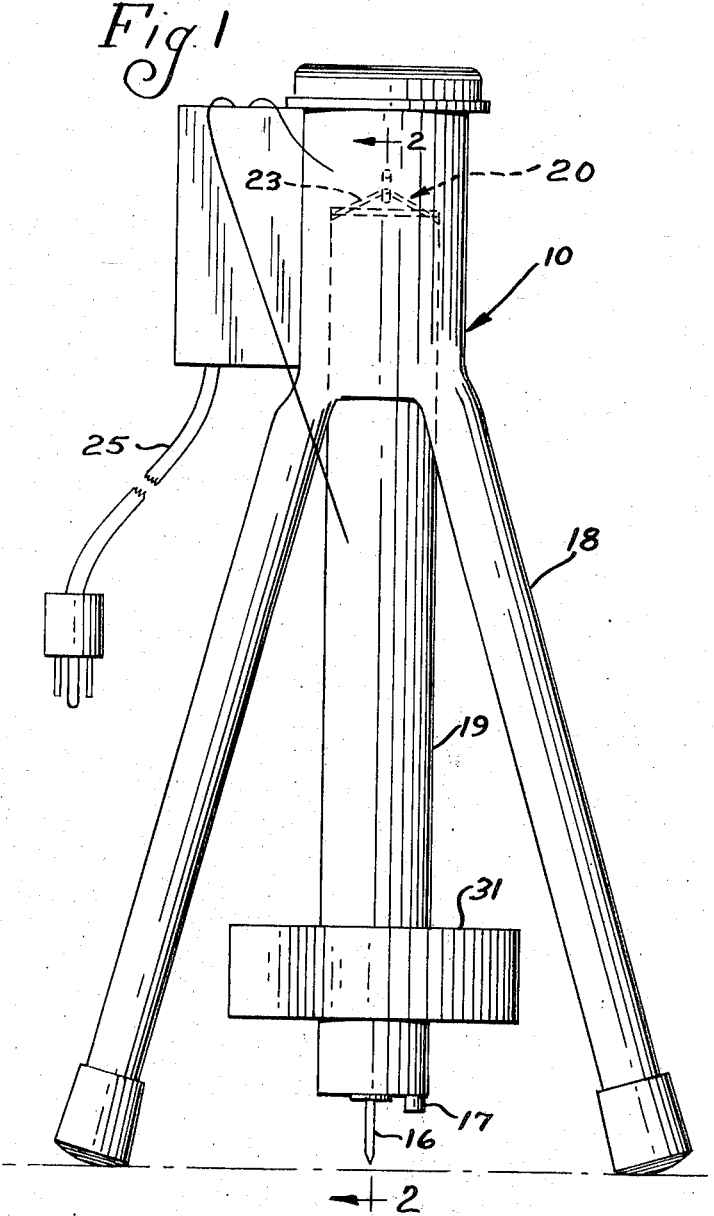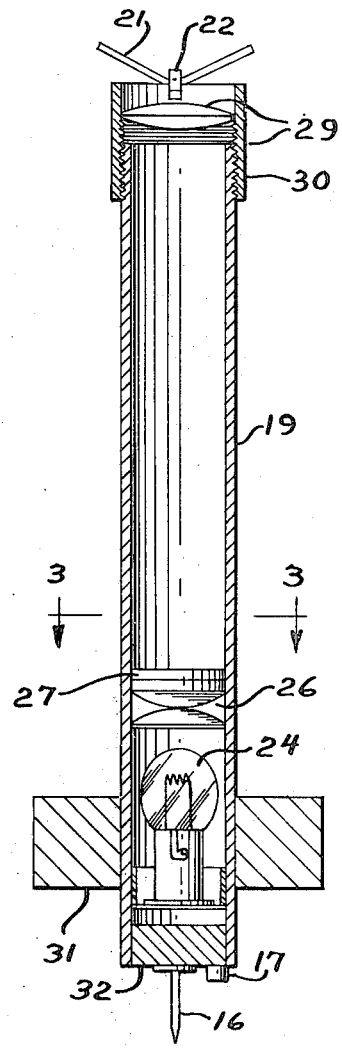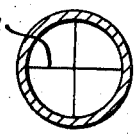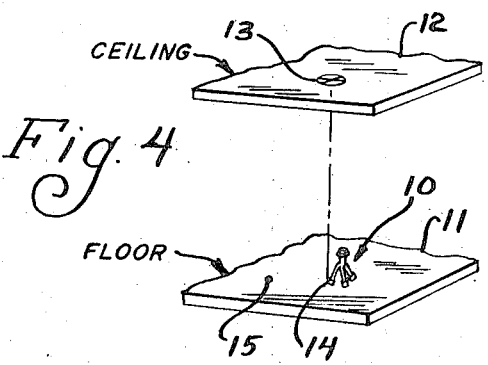

3,772,797

OPTICAL PLUMB BOB AND METHOD

BACKGROUND AND SUMMARY OF INVENTION

This invention is an improvement over the prior art in that precise locating of ceiling points (corresponding to predetermined floor points) can be achieved. Such was not possible in the prior art which can be exemplified by the Esher U. S. Pat. No. 2,517,295.

According to the invention the optical plumb bob is equipped with a cross hair scope or like image-point producing means which enables the user to focus precisely on a pre-selected ceiling point. The optical plumb bob is further equipped with adjustable calibration means which permit the calibration of the bob so as to develop perfect vertical alignment of the optical tube. Thereafter, according to the method of the invention, the optical plumb bob can be shifted from point to point on the floor of a room where ceiling points are to be precisely located and the ray emanating from the tube will fix a point directly above the particular floor point. Other objects and advantages of the invention may be seen as this specification proceeds.

DETAILED DESCRIPTION OF INVENTION

The invention is described in conjunction with an illustrative embodiment in the accompanying drawing, in which FIG. 1 is an elevational view of an optical plumb bob constructed according to the teachings of this invention;

FIG. 2 is a fragmentary vertical sectional view of the bob of FIG. 1;

FIG. 3 is a sectional view along the line 3—3 of FIG. 2; and

FIG. 4 is a fragmentary perspective view of a room wherein the inventive bob is employed in a fashion depicted schematically.

In the illustration given and with reference first to FIG. 4, the numeral 10 designates generally the inventive bob. As pointed out previously this is seen in greater detail and in enlarged scale in FIG. 1. The bob 10 is seen to be positioned on a floor 11 with which is associated a ceiling 12. A preselected spot on the ceiling is designated 13 and the floor spot or point directly below (in a vertical sense) is deisgnated 14. Another floor spot is designated 15.

Briefly, the method of the invention is to utilize the optical plumb bob 10 in such a fashion as to have the ray therefrom provide a cross hair image centered on the point 13. Normally, the optical plumb bob, and more particularly the floor pointer 16 thereof (see FIGS. 1 and 2) will not correspond to a point vertically aligned with the point 13. In other words, the point 14 which can be determined by a manual plumb bob suspended from the point 13 will not be directly below the pointer 16. This stems from the fact that it is virtually impossible to develop an optical tube which is perfectly balanced.

In the following the teachings of the inventive method, the pointer 16 or the weight 17 (again refer to FIGS. 1 and 2) are shifted so as to bring the pointer 16 in line with the point 14 and the projected image centered on point 13. Thus, the optical plumb bob 10 is calibrated for use anywhere within the room space defined by the floor 11 and ceiling 12. Thereafter, for example, the optical plumb bob 10 can be moved so that the pointer 16 thereof is aligned with the point 15.

Then the cross-hair image on the ceiling 12 will provide a point vertically aligned with the point or spot 15 without the need for any further manual operation. As indicated above, the determination of ceiling points is essential for the location of various structural members such as hangars.

Refering now to FIG. 1, the numeral 18 designates a tripod or other base for the optical tube 19. The optical tube 19 is supported for movement about a vertical axis (in a gimbal-like fashion) by means of a pivotal connection generally designated 20. As seen in FIG. 1 and FIG. 2, this includes hangars 21, 22 and 23.

Within the optical tube 19 is mounted a light source 24 (see FIG. 2) which is powered by electricity through a conduit 25 (see FIG. 1). The light beam or ray from the bulb source 24 passes through a condenser lense arrangement 26 (seen only in FIG. 2) and through a scope-like member 27 containing cross-hairs 28 (see also FIG. 3). At the extreme upper end of the optical tube 19 is provided a focusing lense 29 which can be adjusted in different vertical positions by means of the relocation of a threaded holder 30.

The optical tube 19 is further equipped with a stationary weight 31 which insures that the optical plumb bob will assume an attitude of having its axis vertical.

Further, the bottom end of the optical tube 19 is closed by a metallic plug member 32 to which is magnetically attached the pointer 16. Thus, the pointer 16 can be moved to a position eccentric relative to the axis of the tube 19 for the usage previously referred to in calibrating the instrument. In like fashion, the instrument can be calibrated by applying a weight 17 through a magnetic connection to the plug 32 so as to shift slightly the axis of the optical tube 19.

While in the foregoing specification, a detailed description of an embodiment of the invention has been set down for the purpose of explanation, many variations may be made in the details hereinabove given without departing from the spirit and scope of the invention.

I claim:

1. In a method for determining spot locations on ceilings vertically above spot location on floors for the installation of hangars and the like, the steps of locating a floor point and a ceiling point in vertical alignment, positioning a ray delivering optical plumb bob having an adjustable pointer at the lower end thereof so as to center the ray on the ceiling point, calibrating the plumb bob so as to direct a pointer at its other end toward the floor point and, with the plumb bob so calibrated, locating thereby at least one other point on said ceiling vertically above a predetermined point on said floor.

2. The method of claim 1 in which said calibration includes repositioning a magnetically coupled pointer.

3. The method of claim 1 in which said calibration includes applying a magnetic weight eccentrically to the axis of said optical plumb bob.

4. An optical plumb bob comprising a base equipped with pivot means, an optical tube pivotally mounted on said means for movement in a plurality of horizontal directions, said tube including a light source, a cross hair scope and lenses so as to deliver a light ray upwardly and project a cross-hair on a ceiling, the bottom of said tube being equipped with calibration means for directing a pointer associated therewith to a floor point vertically aligned with said ceiling point.

5. The structure of claim 4 in which said calibration means includes a weight adapted to be attached eccentrically of said tube axis.

6. The structure of claim 5 in which said weight is magnetically coupled to said tube.

7. The structure of claim 4 in which said pointer is removably, magnetically coupled to said tube to constitute said calibration means.

* * * * *